United States Patent
Schnetzka et al.

(10) Patent No.: US 9,513,614 B2
(45) Date of Patent: Dec. 6, 2016

(54) AUXILIARY ELECTRIC POWER SYSTEM AND METHOD OF REGULATING VOLTAGES OF THE SAME

(71) Applicant: General Electric Company, Schenectady, NY (US)

(72) Inventors: Harold Robert Schnetzka, Simpsonville, SC (US); Timothy Wilcox Jayko, Ballston Lake, NY (US); Theodore Steven Wilmot, Laurens, SC (US); Branislav Vujanovic, Leipzig (DE)

(73) Assignee: General Electric Company, Schenectady, NY (US)

( * ) Notice: Subject to any disclaimer, the term of this patent is extended or adjusted under 35 U.S.C. 154(b) by 475 days.

(21) Appl. No.: 14/024,044

(22) Filed: Sep. 11, 2013

(65) Prior Publication Data
US 2015/0073610 A1    Mar. 12, 2015

(51) Int. Cl.
| | | |
|---|---|---|
| H02J 11/00 | (2006.01) | |
| G05B 15/02 | (2006.01) | |
| F03D 7/02 | (2006.01) | |
| H02J 3/38 | (2006.01) | |

(52) U.S. Cl.
CPC ............. *G05B 15/02* (2013.01); *F03D 7/0272* (2013.01); *H02J 11/00* (2013.01); *H02J 3/386* (2013.01); *Y02E 10/723* (2013.01); *Y02E 10/763* (2013.01)

(58) Field of Classification Search
CPC ....................................... H02J 11/00
USPC .......................................... 290/44
See application file for complete search history.

(56) References Cited

U.S. PATENT DOCUMENTS

| | | | | |
|---|---|---|---|---|
| 4,256,972 A | * | 3/1981 | Wyatt | G01R 29/18 307/152 |
| 4,442,385 A | * | 4/1984 | Van Sickle | H02J 9/066 310/113 |
| 5,476,293 A | * | 12/1995 | Yang | F03D 7/02 290/4 C |
| 7,015,595 B2 | | 3/2006 | Feddersen et al. | |
| 2004/0145188 A1 | | 7/2004 | Janssen et al. | |

(Continued)

FOREIGN PATENT DOCUMENTS

| | | |
|---|---|---|
| CN | 102709906 A | 10/2012 |
| EP | 1 804 372 A2 | 7/2007 |

(Continued)

OTHER PUBLICATIONS

European Search Report and Written Opinion issued in connection with corresponding EP Application No. 14183620.5-1804 dated Mar. 26, 2015.

*Primary Examiner* — Joseph Waks
(74) *Attorney, Agent, or Firm* — James McGinnes, Esq.; Armstrong Teasdale LLP

(57) ABSTRACT

An electric power system for a wind turbine includes at least one auxiliary load bus configured to transmit electric power to auxiliary equipment. The auxiliary load bus is further configured to receive electric power having a voltage within a first predetermined tolerance range. The system also includes at least one motor-generator set coupled to the auxiliary load bus. The motor-generator set is configured to receive electric power having a voltage within a second predetermined tolerance range and transmit electric power to the auxiliary load bus in the first predetermined tolerance range.

18 Claims, 11 Drawing Sheets

(56) References Cited

U.S. PATENT DOCUMENTS

| | | | | |
|---|---|---|---|---|
| 2010/0171381 | A1* | 7/2010 | Ling | H02K 53/00 |
| | | | | 310/113 |
| 2012/0187680 | A1* | 7/2012 | Spooner | H02J 3/36 |
| | | | | 290/43 |
| 2013/0229056 | A1* | 9/2013 | Teichmann | H02J 3/386 |
| | | | | 307/18 |
| 2014/0252774 | A1* | 9/2014 | Boaventura-Delanoe | F03D 9/007 |
| | | | | 290/55 |

FOREIGN PATENT DOCUMENTS

| | | | | | |
|---|---|---|---|---|---|
| GB | | 456197 | A * | 11/1936 | B60L 13/006 |
| GB | WO 2004107549 | A1 * | 12/2004 | | H02K 47/08 |
| JP | | 59028871 | A * | 2/1984 | |
| WO | | 03/106828 | A2 | 12/2003 | |
| WO | | 2011/019321 | A2 | 2/2011 | |

* cited by examiner

AUXILIARY ELECTRIC POWER SYSTEM AND METHOD OF REGULATING VOLTAGES OF THE SAME

BACKGROUND OF THE INVENTION

The subject matter described herein relates generally to electric power systems, and more specifically, to voltage regulation of an auxiliary electric power system for a wind turbine.

Many known renewable energy facilities are coupled to an electric utility grid. At least some of these known renewable energy facilities include wind turbines. Generally, a wind turbine includes a rotor that includes a rotatable hub assembly having multiple blades. The blades transform wind energy into a mechanical rotational torque that drives one or more generators via the rotor. At least some of the known wind turbines are physically nested together in a common geographical region to form a wind turbine farm, sometimes referred to as a wind farm. Variable speed operation of the wind turbine facilitates enhanced capture of energy when compared to a constant speed operation of the wind turbine. However, variable speed operation of the wind turbine produces electric power having varying voltage and/or frequency. A power converter may be coupled between the wind turbine's electric generator and an electric utility grid. The power converter receives the electric power from the wind turbine generator and transmits electricity having a fixed voltage and frequency for further transmission to the utility grid via a main power transformer. Typically, the high side of the main transformer is coupled to the grid and the low side is coupled to the power converter. Conversely, for those periods when the generator is not is service, electric power may be provided from the grid through the high side of the main power transformer to the low side of the main power transformer and then through the power converter.

Known wind turbines include auxiliary support equipment that facilitates operation of such wind turbines, for example, blade pitch drive motors, lubrication pump motors, and wind turbine and power converter control systems. In at least some wind turbine facilities, when the wind turbine generator is in service, such auxiliary support equipment receives at least a portion of electric power generated by the wind turbine generator through an auxiliary power transformer. The high side of the auxiliary power transformer is coupled to the low side of the main transformer and the low side of the auxiliary transformer may be coupled to the auxiliary support equipment. When the wind turbine generator is not in service, such auxiliary support equipment receives electric power from the grid through the main transformer and the auxiliary transformer. Moreover, such auxiliary support equipment typically has a predetermined voltage tolerance range. For example, at least some known support equipment may have a tolerance range that extends from 90% of nameplate voltage to 110% of nameplate voltage.

In addition, many known electrical grids have voltage tolerance ranges that facilitate reliable electric power transmission and distribution over a wide variety of operational conditions to serve a broad market. For example, many known electrical grids include a grid voltage tolerance range that extends from less than 90% of nominally rated voltage to greater than 110% of nominally rated voltage. As such, many known wind turbines include auxiliary support equipment that is designed to operate within a voltage window that is not fully complimentary to the voltage window of the associated electrical grid. Exceeding the voltage tolerance ranges of the equipment may impair the operation of the equipment. Substituting, or replacing, such auxiliary support equipment with specialized equipment having broader electric power tolerances may be costly and may require an extended period of time that the wind turbine must be removed from service.

Moreover, as more renewable energy sources are coupled to the grid, the requirements for ride through are becoming increasingly stringent. Specifically, in at least some jurisdictions, the temporal requirements and transient voltage amplitude ranges for sustaining ride through are being extended. The wind turbine may not be able to operate through certain grid events occurring on the high side of the transformer, since wind turbine control devices require a finite period of time to sense the event, and then make adjustments to wind turbine operation to take effect after detecting such grid event. Therefore, in the interim period, the wind turbine may sustain wear and/or damage due to certain grid events. Such grid events may include electrical faults that, under certain circumstances, may induce grid voltage fluctuations that may include low voltage transients with voltage fluctuations that approach zero volts. Moreover, such grid events may include grid voltage fluctuations that may include high voltage transients with voltage fluctuations that may approach and/or exceed equipment ratings. In addition, such grid events, under certain conditions, may induce frequency excursions as well.

At least some known protective devices and systems facilitate continued operation during certain grid events. For example, for grid transients such as short circuits, a low, or zero voltage condition on the grid may occur. Under such conditions, such known protective devices and systems define a low and/or a zero voltage ride through (LVRT and ZVRT, respectively) capability. Such LVRT/ZVRT capabilities facilitate operation of the power converters of individual wind turbines and wind turbine farms to transmit reactive power into the utility grid. Such injection of reactive power into the grid facilitates stabilizing the grid voltage while grid isolation devices external to the wind farm, such as automated reclosers, will open and reclose to clear the fault while the LVRT/ZVRT features of the wind turbines maintain the generators coupled to the utility grid. Moreover, for high voltage grid conditions, such known protective devices and systems define a high voltage ride through (HVRT) capability.

Most known main power transformers and auxiliary power transformers tend to transmit the associated voltage transients from the grid to the equipment. For the auxiliary electrical system, HVRT/LVRT/ZVRT capabilities include tap changer systems on the main power transformer and/or the auxiliary power transformer to regulate the voltage of the electric power transmitted from the grid to the auxiliary equipment. However, such changer systems are electromechanical and may not operate quickly enough to maintain the voltage to the auxiliary equipment in the 90% to 110% tolerance band. Also, such tap changer systems regulate the voltage in discrete, incremental steps and may not provide the voltage within the tolerance band to facilitate extended and continuous operation of the auxiliary equipment.

BRIEF DESCRIPTION OF THE INVENTION

In one aspect, an electric power system for a wind turbine is provided. The electric power system includes at least one auxiliary load bus configured to transmit electric power to auxiliary equipment. The auxiliary load bus is further configured to receive electric power having a voltage within a first predetermined tolerance range. The system also includes at least one motor-generator set coupled to the auxiliary load bus. The motor-generator set is configured to receive electric power having a voltage within a second predetermined tolerance range and transmit electric power to the auxiliary load bus in the first predetermined tolerance range.

In another aspect, a renewable energy generation facility is provided. The facility includes at least one electric power doubly-fed induction generator (DFIG) and an auxiliary electric power system coupled to the DFIG. The auxiliary electric power system includes at least one auxiliary load bus configured to receive electric power having a voltage within a first predetermined tolerance range. The system also includes at least one electric power generator auxiliary load coupled to the auxiliary load bus. The auxiliary load bus is configured to transmit electric power to the auxiliary load. The system also includes at least one motor-generator set coupled to the auxiliary load bus. The motor-generator set is configured to receive electric power having a voltage within a second predetermined tolerance range and transmit electric power to the auxiliary load bus in the first predetermined tolerance range.

In yet another aspect, a method for controlling operation of a renewable energy generation system is provided. The renewable energy generation system includes a doubly-fed induction generator (DFIG) and at least one auxiliary load bus configured to receive electric power having a voltage within a first predetermined tolerance range. The method includes transmitting electric power from the DFIG and/or an electric utility grid to a motor-generator set. The electric power has a voltage within a second predetermined tolerance range. The method also includes regulating the motor-generator set to transmit electric power having a voltage within the first predetermined tolerance range to the auxiliary load bus.

DETAILED DESCRIPTION OF THE INVENTION

Figure 1:
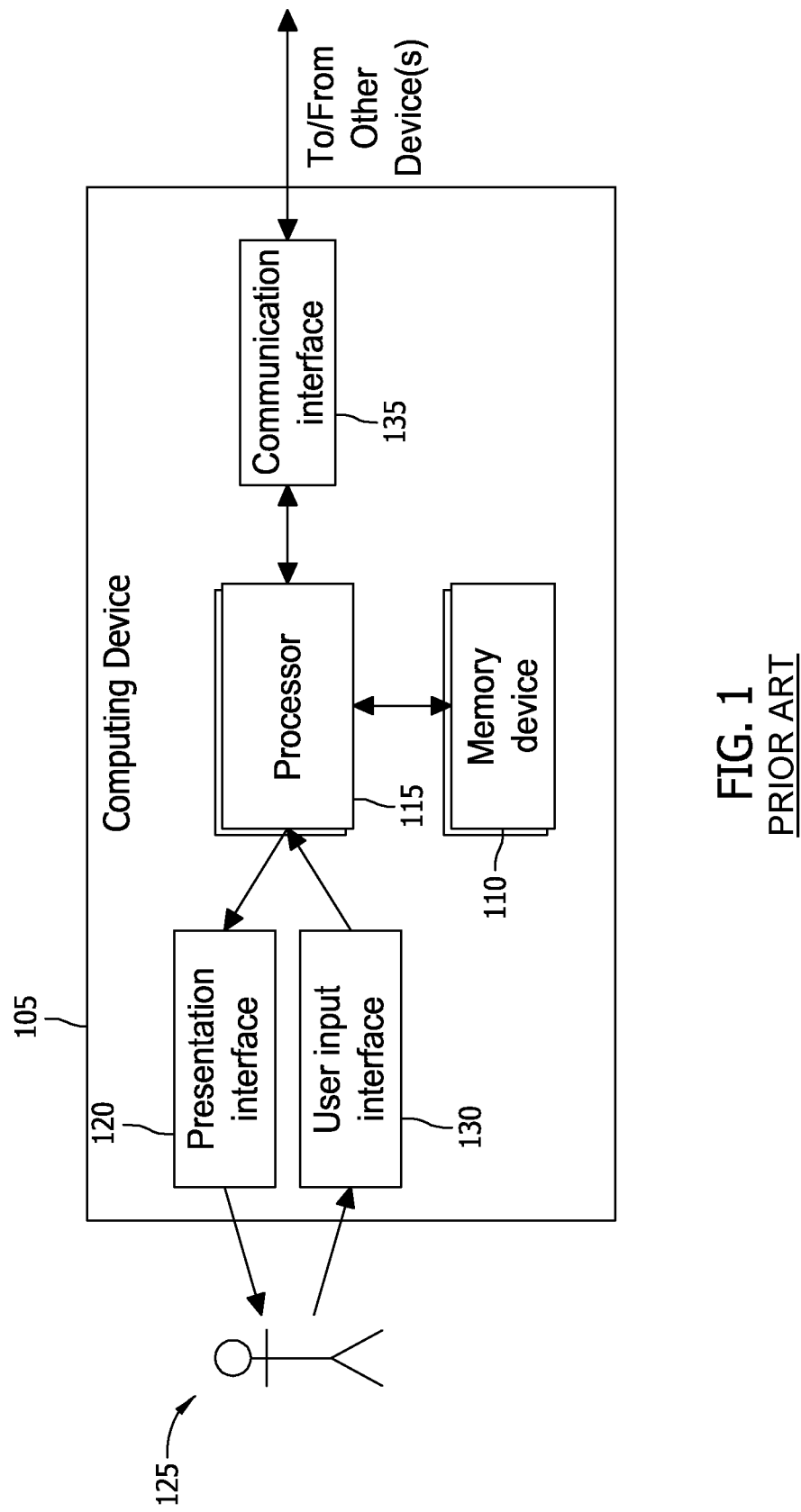
FIG. 1 is a block diagram of an exemplary computing device that may be used to monitor and/or control the operation of a portion of an electric power system.

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind turbine generator" is intended to be representative of any wind turbine that generates electrical power from rotational energy generated from wind energy, and more specifically, converts mechanical energy converted from kinetic energy of wind to electrical power.

As used herein, the terms "disturbance," "grid disturbance," "fault," "system fault," "transient" and other similar terms generally refer to any event that causes perturbations in the input signal from the electric/power grid. For example, such disturbances can include impulses, notches, glitches, momentary interruptions, voltage sag/swells, harmonic distortions, and flickers. Generally, the grid signal is a three-phase signal that includes sequence components having particular frequencies. The three-phase signal includes positive sequence components, negative sequence components, and zero or neutral sequence components. Each of the components includes frequency information, phase information, and magnitude information. As a variety of generating facilities contribute to the grid signal, and as a variety of phenomena including transient events occur, the sequence components may develop harmonic frequencies or phase shifts, either one that can create disturbances which can complicate efficient operation of control systems and/or decrease other aspects of grid performance.

Technical effects of the methods, apparatus, and systems described herein include at least one of: (a) using motor-generator (m-g) sets to provide auxiliary electric power to auxiliary equipment within a predetermined voltage range throughout the range of operation of a wind turbine, including those periods when the wind turbine generator is removed from service and/or during electric transients on the electric power grid; (b) using the momentum in m-g sets to facilitate extended generation of auxiliary electric power to auxiliary equipment within a predetermined voltage range; (c) facilitating extending the range of ratings of auxiliary electric power systems and associated wind turbine generators to comply with grid regulations in a plurality of jurisdictions and countries; (d) facilitating extending the range of ratings of auxiliary electric power systems and associated wind turbine generators to be compatible with a plurality of grid strengths and reliabilities; (e) facilitating coupling of wind turbines generators to series compensated transmission lines by compensating for grid voltage transients that may be exacerbated by associated series capacitors; (f) reducing the need for and/or frequency of operation of tap changers on the main power transformers and auxiliary power transformers; and, (g) enhancing HVRT/LVRT/ZVRT capabilities and performance of wind turbines.

The methods, apparatus, and systems described herein facilitate using motor-generator (m-g) sets to provide auxiliary electric power to auxiliary equipment within predetermined voltage ranges throughout the range of operation of a wind turbine. Specifically, the methods, apparatus, and systems described herein facilitate such auxiliary electric power supply during periods that include when the wind turbine generator is removed from service and/or during electric transients on the electric power grid. More specifically, the methods, apparatus, and systems described herein facilitate using the momentum in m-g sets to facilitate extended generation of auxiliary electric power to auxiliary equipment within a predetermined voltage range during voltage transients on the grid. Also, specifically, the m-g sets facilitate extending the flexibility for adapting auxiliary electric power systems and associated wind turbine generators to comply with to an extended range of ratings of grid regulations in a plurality of jurisdictions and countries, thereby facilitating extending the range of ratings of auxiliary electric power systems and associated wind turbine generators to be compatible with a plurality of grid strengths and reliabilities, including those grids with series compensated transmission lines. Such flexibility reduces the costs of the auxiliary equipment by facilitating use of standard auxiliary support equipment with standard voltage tolerance ratings, rather than using more expensive auxiliary support equipment that is fully complimentary to the extended voltage ranges of the associated electrical grid. Furthermore, such flexibility facilitates reducing the need for and/or frequency of operation of tap changers on the main power transformers and auxiliary power transformers during HVRT/LVRT/ZVRT transients.

Moreover, the methods, apparatus, and systems described herein include the use of a variety of m-g set types, including induction motors and permanent-magnet motors with and without starters coupled to permanent-magnet generators with and without voltage regulators. Therefore, the methods, apparatus, and systems described herein facilitate eliminating a need for specialized hardware, thereby decreasing construction costs and operational and maintenance costs.

Although generally described herein with respect to a wind turbine facility, the systems described herein are applicable to any type of electric generation system including, for example, solar power generation systems, fuel cells, geothermal generators, hydropower generators, and/or other devices that generate power from renewable and/or non-renewable energy sources.

FIG. 1 is a block diagram of an exemplary computing device 105 that may be used to monitor and/or control the operation of a portion of an auxiliary electric power system (not shown in FIG. 1). Computing device 105 includes a memory device 110 and a processor 115 operatively coupled to memory device 110 for executing instructions. As used herein, the term "processor" includes any suitable programmable circuit such as, without limitation, one or more systems and microcontrollers, microprocessors, a general purpose central processing unit (CPU), reduced instruction set circuits (RISC), application specific integrated circuits (ASIC), programmable logic circuits (PLC), field programmable gate arrays (FPGA), and/or any other circuit capable of executing the functions described herein. The above examples are exemplary only, and thus are not intended to limit in any way the definition and/or meaning of the term "processor."

Processor 115 may include one or more processing units (e.g., in a multi-core configuration). In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110.

In addition, in the exemplary embodiment, memory device 110 is at least one device coupled to processor 115 that enables storage and retrieval of information such as computer-executable instructions and data, including, without limitation, operating data, parameters, setpoints, threshold values, and/or any other data that enables computing device 105 to function as described herein. Memory device 110 may include one or more tangible, non-transitory, computer readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Further, as used herein, the terms "software" and "firmware" are interchangeable, and include any computer program stored in memory for execution by personal computers, workstations, clients and servers.

Memory device 110 may be configured to store operational measurements including, without limitation, utility electric power grid voltage and current readings (not shown in FIG. 1), substation voltage and current readings (not shown in FIG. 1), localized voltage and current readings throughout an electric power system, including an auxiliary electric power system and an electric power generation system (both not shown in FIG. 1), and/or any other type of data. In some embodiments, processor 115 removes or "purges" data from memory device 110 based on the age of the data. For example, processor 115 may overwrite previously recorded and stored data associated with a subsequent time and/or event. In addition, or alternatively, processor 115 may remove data that exceeds a predetermined time interval. Also, memory device 110 includes, without limitation, sufficient data, algorithms, and commands to facilitate centralized and distributed control of electric power system protection and control systems (discussed further below).

In some embodiments, computing device 105 includes a presentation interface 120 coupled to processor 115. Presentation interface 120 presents information, such as a user interface and/or an alarm, to a user 125. In one embodiment, presentation interface 120 includes a display adapter (not shown) that is coupled to a display device (not shown), such as a cathode ray tube (CRT), a liquid crystal display (LCD), an organic LED (OLED) display, and/or an "electronic ink" display. In some embodiments, presentation interface 120 includes one or more display devices. In addition, or alternatively, presentation interface 120 includes an audio output device (not shown) (e.g., an audio adapter and/or a speaker) and/or a printer (not shown). In some embodiments, presentation interface 120 presents an alarm associated with a synchronous machine (not shown in FIG. 1), such as by using a human machine interface (HMI) (not shown).

In some embodiments, computing device 105 includes a user input interface 130. In the exemplary embodiment, user input interface 130 is coupled to processor 115 and receives input from user 125. User input interface 130 may include, for example, a keyboard, a pointing device, a mouse, a stylus, a touch sensitive panel (e.g., a touch pad or a touch screen), and/or an audio input interface (e.g., including a microphone). A single component, such as a touch screen, may function as both a display device of presentation interface 120 and user input interface 130.

A communication interface 135 is coupled to processor 115 and is configured to be coupled in communication with one or more other devices, such as a sensor or another computing device 105, and to perform input and output operations with respect to such devices. For example, communication interface 135 may include, without limitation, a wired network adapter, a wireless network adapter, a mobile telecommunications adapter, a serial communication adapter, and/or a parallel communication adapter. Communication interface 135 may receive data from and/or transmit data to one or more remote devices. For example, a communication interface 135 of one computing device 105 may transmit an alarm to the communication interface 135 of another computing device 105.

Presentation interface 120 and/or communication interface 135 are both capable of providing information suitable for use with the methods described herein (e.g., to user 125 or another device). Accordingly, presentation interface 120 and communication interface 135 may be referred to as output devices. Similarly, user input interface 130 and communication interface 135 are capable of receiving information suitable for use with the methods described herein and may be referred to as input devices.

Figure 2:
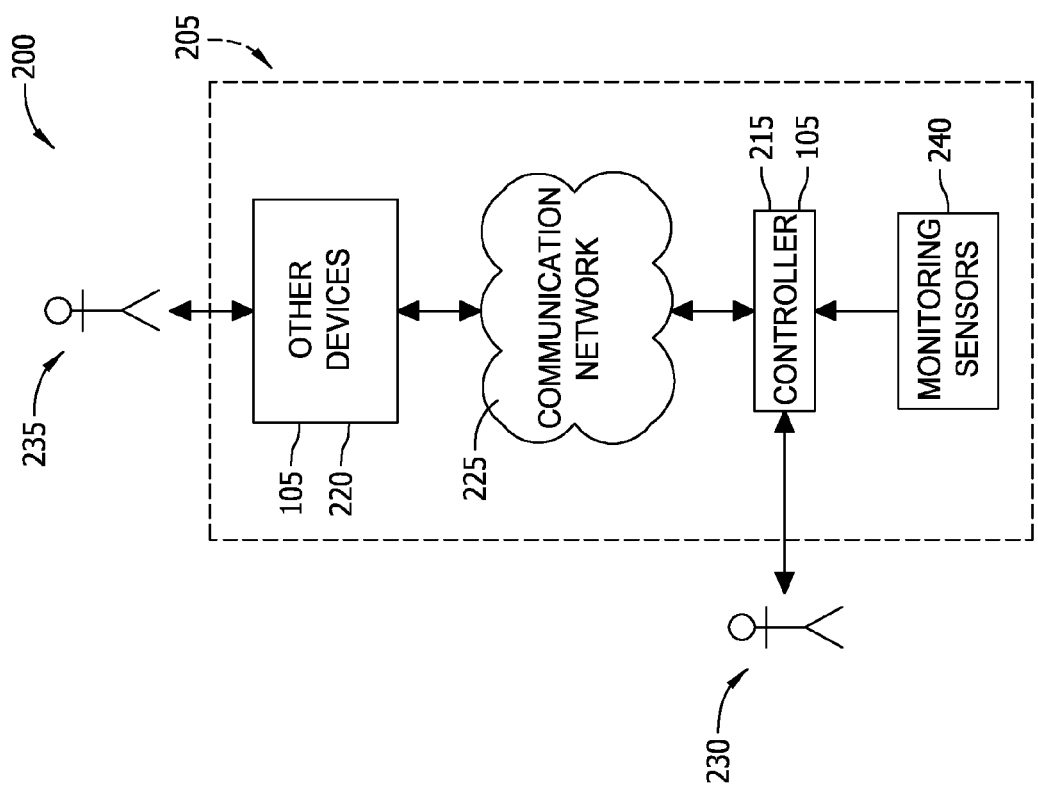
FIG. 2 is block diagram of a portion of an exemplary electric power system protection and control system.

FIG. 2 is block diagram of a portion of an exemplary auxiliary electric power system protection and control system 200 that may be used to monitor and/or operate at least a portion of an auxiliary electric power system 205. Auxiliary electric power system protection and control system 200 includes an auxiliary electric power system protection and control system controller 215 that may be coupled to other devices 220 via a communication network 225. Protection and control system controller 215 may be, without limitation, a substation-level centralized controller, a wind turbine-level centralized controller, and one of a plurality of distributed controllers. Embodiments of network 225 may include operative coupling with, without limitation, the Internet, a local area network (LAN), a wide area network (WAN), a wireless LAN (WLAN), and/or a virtual private network (VPN). While certain operations are described below with respect to particular computing devices 105, it is contemplated that any computing device 105 may perform one or more of the described operations. For example, controller 215 may perform all of the operations below.

Referring to FIGS. 1 and 2, controller 215 is a computing device 105. In the exemplary embodiment, computing device 105 is coupled to network 225 via communication interface 135. In an alternative embodiment, controller 215 is integrated with other devices 220. As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits (none shown in FIG. 2), and these terms are used interchangeably herein.

Controller 215 interacts with a first operator 230 (e.g., via user input interface 130 and/or presentation interface 120). In one embodiment, controller 215 presents information about auxiliary electric power system 205, such as alarms, to operator 230. Other devices 220 interact with a second operator 235 (e.g., via user input interface 130 and/or presentation interface 120). For example, other devices 220 present alarms and/or other operational information to second operator 235. As used herein, the term "operator" includes any person in any capacity associated with operating and maintaining auxiliary electric power system 205, including, without limitation, shift operations personnel, maintenance technicians, and system supervisors.

In the exemplary embodiment, protection and control system 200 includes one or more monitoring sensors 240. Monitoring sensors 240 collect operational measurements including, without limitation, voltage and current readings throughout auxiliary electric power system 205, including, without limitation, utility electric power grid voltage and current readings (not shown in FIGS. 1 and 2), substation voltage and current readings (not shown in FIGS. 1 and 2), localized voltage and current readings throughout an electric power system, including auxiliary electric power system 205 and an electric power generation system (not shown in FIGS. 1 and 2), and/or any other type of data. Monitoring sensors 240 repeatedly (e.g., periodically, continuously, and/or upon request) transmit operational measurement readings at the time of measurement. Controller 215 receives and processes the operational measurement readings. Also, controller 215 includes, without limitation, sufficient data, algorithms, and commands to facilitate centralized and/or distributed protection and control of auxiliary electric power system 205 (discussed further below).

Also, in the exemplary embodiment, auxiliary electric power system 205 includes additional monitoring sensors (not shown) similar to monitoring sensors 240 that collect operational data measurements associated with the remainder of auxiliary electric power system 205 including, without limitation, data from additional devices similar to controller 215 and environmental data, including, without limitation, local outside temperatures. Such data is transmitted across network 225 and may be accessed by any device capable of accessing network 225 including, without limitation, desktop computers, laptop computers, and personal digital assistants (PDAs) (neither shown).

The methods described herein may be encoded as executable instructions and algorithms embodied in a tangible, non-transitory, computer readable medium, including, without limitation, a storage device and/or a memory device. Such instructions and algorithms, when executed by a processor, cause the processor to perform at least a portion of the methods described herein. Moreover, as used herein, the term "non-transitory computer-readable media" includes all tangible, computer-readable media, such as a firmware, physical and virtual storage, CD-ROMs, DVDs and another digital source such as a network or the Internet, as well as yet to be developed digital means, with the sole exception being a transitory, propagating signal.

Figure 3:
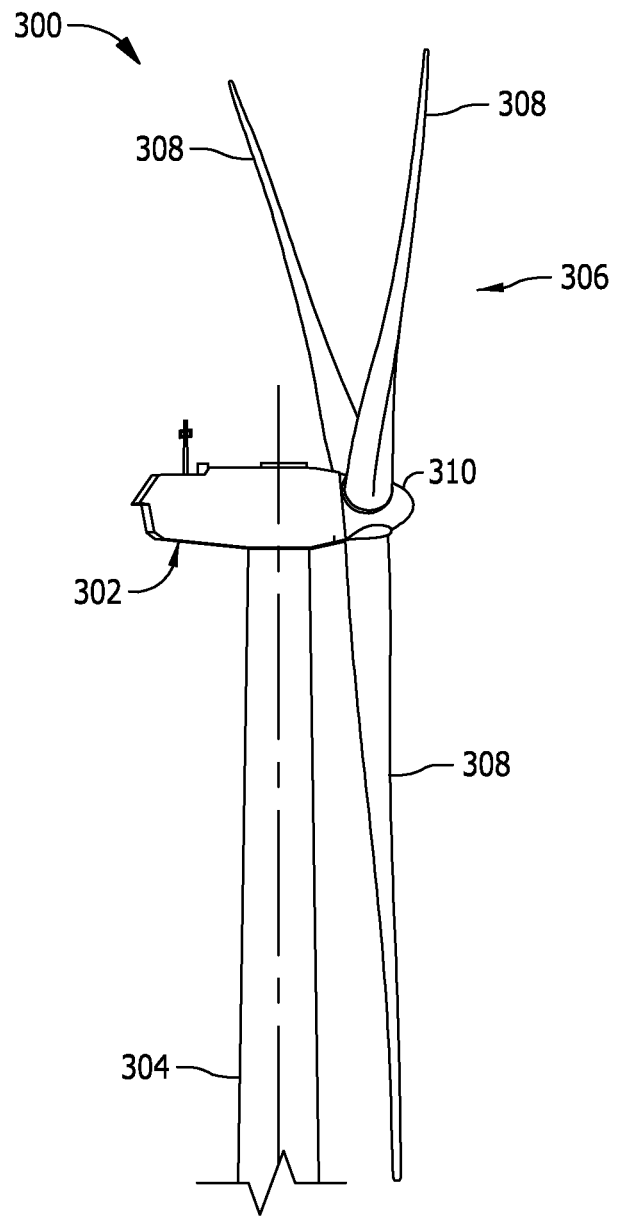
FIG. 3 is a schematic view of an exemplary wind turbine.

FIG. 3 is a schematic view of an exemplary wind turbine generator 300. Wind turbine generator 300 is an electric power generation device including a nacelle 302 housing a generator (not shown in FIG. 3). Nacelle 302 is mounted on a tower 304 (a portion of tower 304 being shown in FIG. 3). Tower 304 may be any height that facilitates operation of wind turbine generator 300 as described herein. Wind turbine generator 300 also includes a rotor 306 that includes three rotor blades 308 attached to a rotating hub 310. Alternatively, wind turbine generator 300 includes any number of blades 308 that facilitates operation of wind turbine generator 300 as described herein. In the exemplary embodiment, wind turbine generator 300 includes a gearbox (not shown in FIG. 3) rotatably coupled to rotor 306 and the generator.

Figure 4:
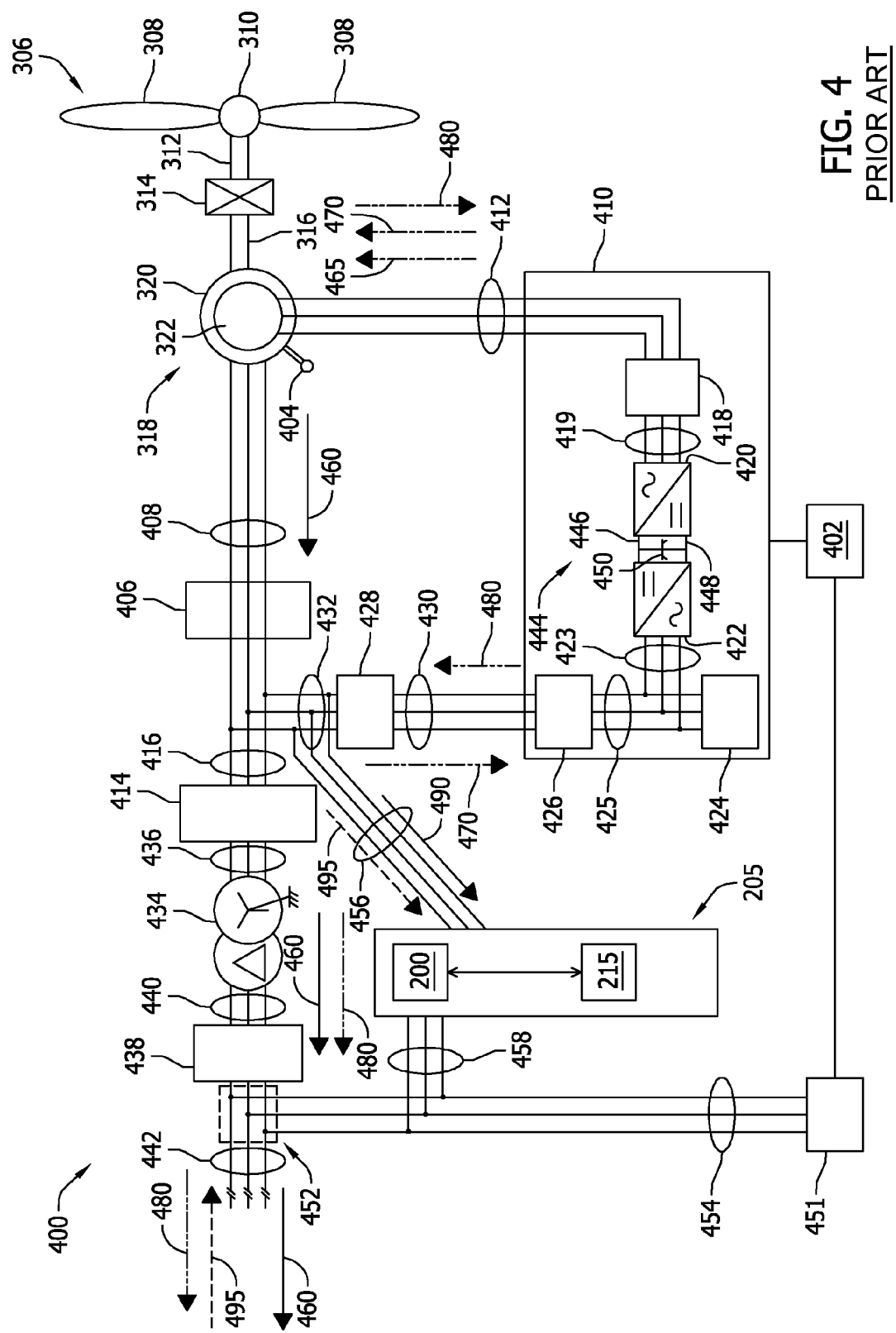
FIG. 4 is a schematic view of an exemplary electric power system for a doubly fed induction generator (DFIG) that may be used with the wind turbine shown in FIG. 3.

FIG. 4 is a schematic view of an exemplary electric power system 400 that may be used with wind turbine 300. Rotor 306 includes plurality of rotor blades 308 coupled to rotating hub 310. Rotor 306 also includes a low-speed shaft 312 rotatably coupled to hub 310. Low-speed shaft is coupled to a step-up gearbox 314. Gearbox 314 is configured to step up the rotational speed of low-speed shaft 312 and transfer that speed to a high-speed shaft 316. In the exemplary embodiment, gearbox 314 can have a step-up ratio of approximately 70:1. For example, low-speed shaft 312 rotating at approximately 20 revolutions per minute (20) coupled to gearbox 314 with an approximately 70:1 step-up ratio generates a high-speed shaft 316 speed of approximately 1400 rpm. Alternatively, gearbox 314 has any step-up ratio that facilitates operation of wind turbine 300 as described herein. Also, alternatively, wind turbine 300 includes a direct-drive generator wherein a generator rotor (not shown in FIG. 4) is rotatingly coupled to rotor 306 without any intervening gearbox.

High-speed shaft 316 is rotatably coupled to a generator 318. In the exemplary embodiment, generator 318 is a wound rotor, synchronous, 60 Hz, three-phase, doubly-fed induction generator (DFIG) that includes a generator stator 320 magnetically coupled to a generator rotor 322. Alternatively, generator 318 is any generator of any number of phases that facilitates operation of wind turbine 300 as described herein.

Electric power system 400 is a three-phase system and includes a controller 402. Controller 402 is any processing device that enables operation of electric power system 400 as described herein, including, without limitation, controller 215 (shown in FIG. 2). Processors for controller 402 process information transmitted from a plurality of electrical and electronic devices that may include, but not be limited to, speed and power transducers, current transformers and/or current transducers, breaker position indicators, potential transformers and/or voltage transducers, and the like.

Electric power system 400 also includes generator rotor tachometer 404 that is coupled in electronic data communication with generator 318 and controller 402. Generator stator 320 is electrically coupled to a stator synchronizing switch 406 via a stator bus 408. In the exemplary embodiment, to facilitate the DFIG configuration, generator rotor 322 is electrically coupled to a bi-directional electric power conversion assembly 410 via a rotor bus 412. Alternatively, system 400 is configured as a full power conversion system (not shown), wherein a full power conversion assembly (not shown) that is similar in design and operation to electric power conversion assembly 410 is electrically coupled to stator 320 and such full power conversion assembly facilitates channeling electrical power between stator 320 and an electric power transmission and distribution grid (not shown). Stator bus 408 transmits three-phase power from stator 320 and rotor bus 412 transmits three-phase power from rotor 322 to electric power conversion assembly 410. Stator synchronizing switch 406 is electrically coupled to a main transformer circuit breaker 414 via a system bus 416.

Electric power conversion assembly 410 includes a rotor filter 418 that is electrically coupled to rotor 322 via rotor bus 412. Rotor filter 418 is electrically coupled to a rotor-side, bi-directional power converter 420 via a rotor filter bus 419. Converter 420 is electrically coupled to a line-side, bi-directional power converter 422. Converters 420 and 422 are substantially identical. Power converter 422 is electrically coupled to a line filter 424 and a line contactor 426 via a line-side power converter bus 423 and a line bus 425. In the exemplary embodiment, converters 420 and 422 are configured in a three-phase, pulse width modulation (PWM) configuration including insulated gate bipolar transistor (IGBT) switching devices (not shown in FIG. 4) that "fire" as is known in the art. Alternatively, converters 420 and 422 have any configuration using any switching devices that facilitate operation of system 400 as described herein. Assembly 410 is coupled in electronic data communication with controller 402 to control the operation of converters 420 and 422.

Line contactor 426 is electrically coupled to a conversion circuit breaker 428 via a conversion circuit breaker bus 430. Circuit breaker 428 is also electrically coupled to system circuit breaker 414 via system bus 416 and connection bus 432. System circuit breaker 414 is electrically coupled to an electric power main transformer 434 via a generator-side bus 436. Main transformer 434 is electrically coupled to a grid circuit breaker 438 via a breaker-side bus 440. Grid breaker 438 is connected to an electric power transmission and distribution grid via a grid bus 442.

In the exemplary embodiment, converters 420 and 422 are coupled in electrical communication with each other via a single direct current (DC) link 444. Alternatively, converters 420 and 422 are electrically coupled via individual and separate DC links (not shown in FIG. 4). DC link 444 includes a positive rail 446, a negative rail 448, and at least one capacitor 450 coupled therebetween. Alternatively, capacitor 450 is one or more capacitors configured in series or in parallel between rails 446 and 448.

Electric power system 400 may further include a phase-locked loop (PLL) regulator 451 that is configured to receive a plurality of voltage measurement signals from a plurality of voltage transducers 452. In the exemplary embodiment, each of three voltage transducers 452 are electrically coupled to each one of the three phases of bus 442. Alternatively, voltage transducers 452 are electrically coupled to system bus 416. Also, alternatively, voltage transducers 452 are electrically coupled to any portion of system 400 that facilitates operation of system 400 as described herein. PLL regulator 451 is coupled in electronic data communication with controller 402 and voltage transducers 452 via a plurality of electrical conduits 454. Alternatively, PLL regulator 451 is configured to receive any number of voltage measurement signals from any number of voltage transducers 452, including, but not limited to, one voltage measurement signal from one voltage transducer 452. Controller 402 can also receive any number of current feedbacks from current transformers or current transducers that are electrically coupled to any portion of system 400 that facilitates operation of system 400 as described herein such as, for example, and without limitation, stator current feedback from stator bus 408, grid current feedback from generator side bus 436.

During operation, wind impacts blades 308 and blades 308 transform mechanical wind energy into a mechanical rotational torque that rotatingly drives low-speed shaft 312 via hub 310. Low-speed shaft 312 drives gearbox 314 that subsequently steps up the low rotational speed of shaft 312 to drive high-speed shaft 316 at an increased rotational speed. High speed shaft 316 rotatingly drives rotor 322. A rotating magnetic field is induced within rotor 322 and a voltage is induced within stator 320 that is magnetically coupled to rotor 322. Generator 318 converts the rotational mechanical energy to a sinusoidal, three-phase alternating current (AC) electrical energy signal in stator 320. The associated electrical power is transmitted to main transformer 434 via bus 408, switch 406, bus 416, breaker 414 and bus 436. Main transformer 434 steps up the voltage amplitude of the electrical power and the transformed electrical power is further transmitted to a grid via bus 440, circuit breaker 438 and bus 442.

In the doubly-fed induction generator configuration, a second electrical power transmission path is provided. Electrical, three-phase, sinusoidal, AC power is generated within wound rotor 322 and is transmitted to assembly 410 via bus 412. Within assembly 410, the electrical power is transmitted to rotor filter 418 wherein the electrical power is modified for the rate of change of the PWM signals associated with converter 420. Converter 420 acts as a rectifier and rectifies the sinusoidal, three-phase AC power to DC power. The DC power is transmitted into DC link 444. Capacitor 450 facilitates mitigating DC link 444 voltage amplitude variations by facilitating mitigation of a DC ripple associated with AC rectification.

The DC power is subsequently transmitted from DC link 444 to power converter 422 wherein converter 422 acts as an inverter configured to convert the DC electrical power from DC link 444 to three-phase, sinusoidal AC electrical power with pre-determined voltages, currents, and frequencies. This conversion is monitored and controlled via controller 402. The converted AC power is transmitted from converter 422 to bus 416 via buses 423 and 425, line contactor 426, bus 430, circuit breaker 428, and bus 432. Line filter 424 compensates or adjusts for harmonic currents in the electric power transmitted from converter 422. Stator synchronizing switch 406 is configured to close such that connecting the three-phase power from stator 320 with the three-phase power from assembly 410 is facilitated.

Circuit breakers 428, 414, and 438 are configured to disconnect corresponding buses, for example, when current flow is excessive and can damage the components of the system 400. Additional protection components are also provided, including line contactor 426, which may be controlled to form a disconnect by opening a switch (not shown in FIG. 4) corresponding to each of the lines of the line bus 430.

Assembly 410 compensates or adjusts the frequency of the three-phase power from rotor 322 for changes, for example, in the wind speed at hub 310 and blades 308. Therefore, in this manner, mechanical and electrical rotor frequencies are decoupled and the electrical stator and rotor frequency matching is facilitated substantially independently of the mechanical rotor speed.

Also, in the exemplary embodiment, electric power system 400 includes auxiliary electric power system 205 that includes auxiliary electric power system protection and control system 200 and associated auxiliary electric power system protection and control system controller 215. Controller 215 is coupled to, and controls the operation of, auxiliary electric power system 205 that facilitates transmission of electric power to auxiliary systems and devices, e.g., and without limitation, lubrication pumping devices, tower hoisting equipment, lighting systems, uninterruptible power supplies, and in some embodiments, some control systems for electric power conversion assembly 410 and DFIG 318. System 205 is coupled to connection bus 432 through a plurality of electrical conduits 456.

In the exemplary embodiment, controller 215 is a portion of a distributed control scheme, wherein, in some embodiments, controller 215 is a de-centralized controller for auxiliary electric power system 205 and auxiliary electric power system protection and control system 200. Alternatively, controller 215 is a centralized controller for the entirety of electric power system 400. Furthermore, auxiliary electric power system protection and control system 200 includes at least one monitoring sensor 240 (shown in FIG. 2) coupled to various devices to collect operational measurements including, without limitation, voltage and current readings throughout auxiliary electric power system 205, including, without limitation, utility electric power grid bus 442 voltage and current readings through a plurality of electrical conduits 458. Also, system 200 may include at least one monitoring sensor 240 to collect operational measurements including, without limitation, additional voltage and current readings throughout auxiliary electric power system 205, including, without limitation, a substation (not shown) voltage and current readings, localized voltage and current readings throughout electric power system 400, including auxiliary electric power system 205 and an electric power generation system, e.g., without limitation, electric power conversion assembly 410, DFIG 318, and main power transformer 434, and/or any other type of data.

In operation, sinusoidal three-phase AC electric power generated by stator 320 of DFIG 318 is transmitted to electric power grid bus 442 through stator bus 408, stator synchronizing switch 406, line bus 416, main transformer breaker 414, generator-side bus 436, main power transformer 434, breaker-side bus 440, and grid circuit breaker 438 to electric power grid bus 442 as shown by arrows 460.

Also, in operation, the relative speeds between generator rotor 322 and generator stator 320 determines operation of electric power conversion assembly 410. For those circumstances when generator rotor 322 is being turned at a speed slower than synchronous speed as defined by generator stator 320, i.e., a subsynchronous speed, electric power conversion assembly 410 excites generator rotor 322 with reactive power 465 transmitted from rotor-side power converter 420 through rotor bus 412. Generator rotor 322 will then appear to be turning at a synchronous speed with respect to generator stator 320 and stator 320 will generate the desired, i.e., synchronous frequency, electric power 460 that is transmitted to electric power grid bus 442 as described above.

For those circumstances when generator rotor 322 is being turned at synchronous speed, electric power conversion assembly 410 excites generator rotor 322 with real power 470 transmitted from rotor-side power converter 420 through rotor bus 412. Generator stator 320 generates electric power 460 at the synchronous frequency that is transmitted to electric power grid bus 442 as described above.

For those circumstances when generator rotor 322 is being turned at a speed faster than the synchronous speed, i.e., a supersynchronous speed, electric power conversion assembly 410 excites generator rotor 322 with reactive power 470 transmitted from rotor-side power converter 420 through rotor bus 412 while at the same time extracting real power 480 from generator rotor 322 through rotor bus 412 to rotor-side power converter 420. Generator rotor 322 will then appear to be turning at a synchronous speed with respect to generator stator 320 and stator 320 will generate electric power 460 at the synchronous frequency that is transmitted to electric power grid bus 442 as described above. The frequency of power 480 extracted from generator rotor 322 will be converted to the synchronous frequency through electric power conversion assembly 410 and rotor-generated electric power 480 is added to stator-generated power 460.

Further, in operation, when generator rotor 322 is generating electric power 460 for transmission to grid bus 442, line-side power converter 422 of electric power conversion assembly 410 is synchronized with the frequency on system bus 416, typically a substantially constant 60 Hertz (Hz). Alternatively, the synchronous frequency is any frequency that enables operation of electric power system 400 and auxiliary electric power system 205 as described herein, including, without limitation, 50 Hz. Therefore, depending on the frequency requirements, the switching devices of line-side power converter 422 are switching at a switching rate that enables a synchronous frequency of either 50 Hz or 60 Hz.

Also, during such operation in subsynchronous, synchronous, and supersynchronous modes, converter controller 402 operates the switching devices in line-side power converter 422 at the predetermined frequency, e.g., 60 Hz, to convert DC power to AC power for transmission to electric power grid bus 442. As such, controller 402 regulates the inductive properties, and therefore the power losses, of buses 430 and 432, including any inductive devices coupled thereto, such that a predetermined value of current is transmitted from an electrical conductor, i.e., positive DC rail 446 and negative DC rail 448 of DC link 444 to grid bus 442 as a function of a measured voltage on DC link 444.

Moreover, in operation, when DFIG 318 is generating and transmitting electric power 460 to grid bus 442, a portion of electric power 460 is transmitted to auxiliary electric power system 205 as shown by arrows 490. Alternatively, when DFIG 318 is removed from service, auxiliary electric power is transmitted from grid bus 442 through grid circuit breaker 438, transformer 434, circuit breaker 414 to auxiliary electric power system 205 as shown by arrows 495.

Figure 5:
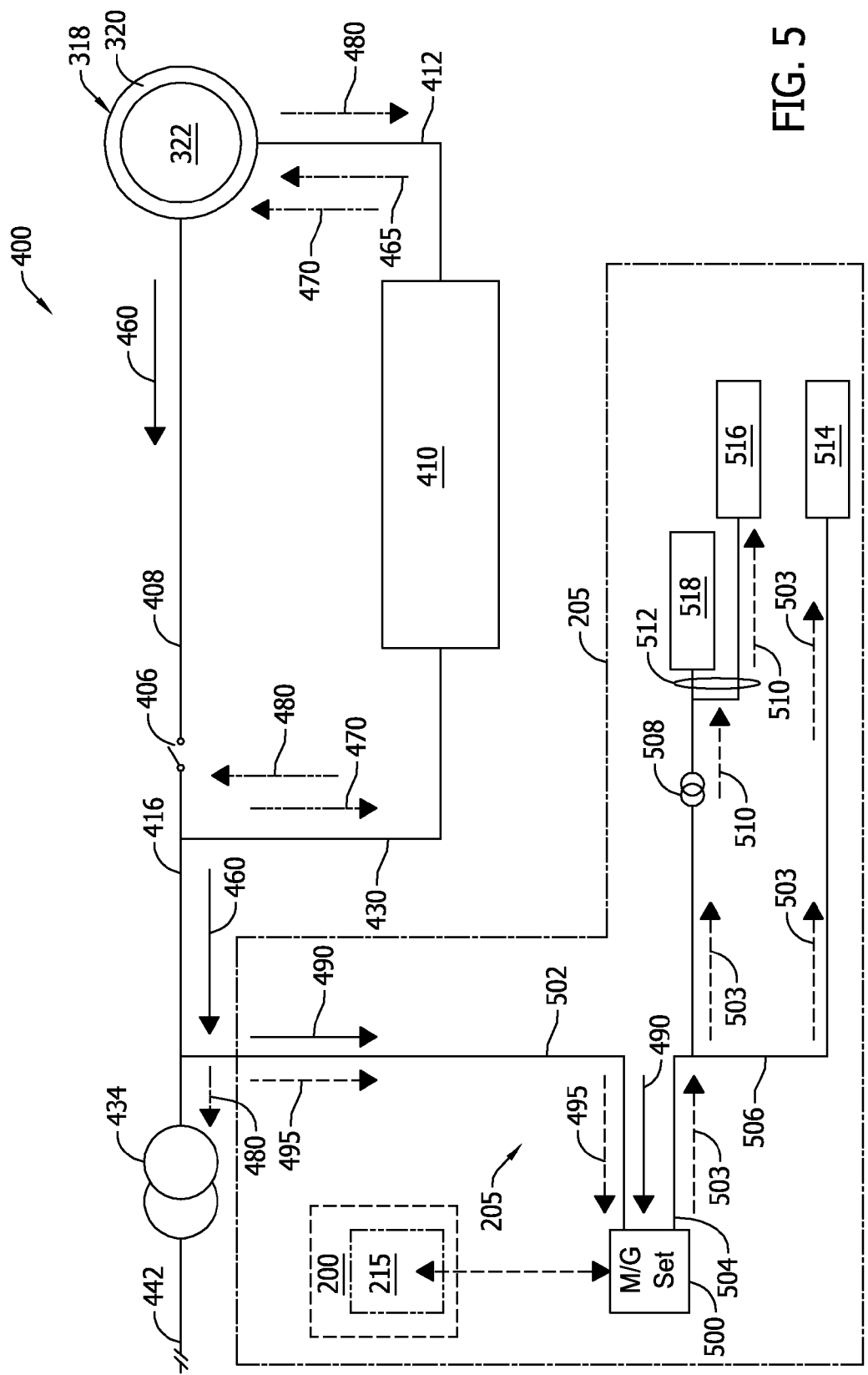
FIG. 5 is a schematic view of an exemplary auxiliary electric power system that may be used with the electric power system shown in FIG. 4.

FIG. 5 is a schematic view of exemplary auxiliary electric power system 205 that is used with electric power system 400. Auxiliary electric power system 205 includes at least one motor-generator (m/g) set 500 (only one shown) coupled to system bus 416 through a supply conduit 502. Auxiliary electric power system 205 includes any number of m/g sets 500 that enables operation of system 205 as described herein. M/g set 500 is configured to receive generated electric power 490 or grid power 495, depending on the status of operation of DFIG 318. M/g set 500 is also configured to generate auxiliary electric power 503 having a voltage within a first predetermined range. M/g set 500 may be coupled to controller 215 of auxiliary electric power system protection and control system 200.

Auxiliary electric power system 205 also includes a plurality of auxiliary load conduits 504 and 506 each configured to receive electric power from m/g set 500 having a voltage with the first predetermined range. System 205 further includes at least one auxiliary power transformer 508 (only one shown) coupled to at least one of conduits 504 and 506. Auxiliary power transformer 508 is configured to receive auxiliary electric power 503 having a voltage within the first predetermined range and generating auxiliary electric power 510 having a voltage within a second predetermined range to a plurality of auxiliary load conduits 512.

Auxiliary electric power system 205 also includes a plurality of auxiliary load buses 514, 516, and 518. Auxiliary load bus 514 is configured to supply auxiliary loads (not shown) with auxiliary electric power 503 with a voltage within the first predetermined range. For example, and without limitation, such loads may include those loads rated for approximately 690 VAC. Auxiliary load buses 516 and 518 are configured to supply auxiliary loads (not shown) with auxiliary electric power 510 with a voltage within the second predetermined range. Such loads include, without limitation, those loads rated for one of 400 VAC, 208 VAC, 173 VAC, including single-phase and three-phase AC, e.g., without limitation, hoists, pumps, fans, heaters, and universal power supplies (UPS). Multiple auxiliary power transformers 508 with differing input and output voltage ratings may be cascaded to supply different voltages to the auxiliary loads.

In some alternative embodiments, m/g set 500, auxiliary power transformer 508, auxiliary load buses 514, 516, and 518 and their respective loads are configured such that m/g set 500 is configured to transmit auxiliary electric power 510 to auxiliary power transformer 508 and auxiliary load bus 514 in the second predetermined voltage tolerance range and auxiliary power transformer 508 is configured to transmit auxiliary electric power 503 to auxiliary load buses 516 and 518 in the first predetermined voltage tolerance range. For example, and without limitation, auxiliary power transformer 508 is configured as a step-down transformer in the exemplary embodiment and may be configured as a step-up transformer in alternative embodiments.

In operation, m/g set 500 receives generated electric power 490 when DFIG 318 is in service and receives grid power 495 when DFIG 318 is removed from service. M/g set 500 generates auxiliary electric power 503 with a frequency of approximately 60 Hz and within the first predetermined voltage tolerance range that includes 690 VAC. Auxiliary electric power 503 is transmitted to auxiliary load bus 514 through conduit 506. Auxiliary electric power 503 is also transmitted to auxiliary power transformer 508 that generates and transmits auxiliary electric power 510 with a frequency of approximately 60 Hz and within the second predetermined voltage tolerance range that includes at least one of 400 VAC, 208 VAC, and 173 VAC. Alternatively, the first and second predetermined voltage tolerance ranges may include any voltages that enable operation of auxiliary electric power system 205 as described herein.

Also, in operation, with circumstances that include DFIG 318 out of service and grid electric power 495 transmitted to auxiliary electric power system 205, voltages of grid electric power 495 may vary within a predetermined voltage tolerance range that may be wider than the rated voltage tolerance ranges of the loads powered from auxiliary load buses 514, 516, and 518. Therefore, m/g set 500 receives grid electric power 495 from grid bus 442 through main power transformer 434. In some embodiments, transformer 434 may include devices to mitigate the effects of the voltage excursions on grid bus 442, e.g., without limitation, tap changers (not shown). However, tap changers may not be sufficiently rapid in operation to mitigate the voltage transients to auxiliary load buses 514, 516, and 518 such that the rated voltage tolerance bands of buses 514, 516, and 518 are not exceeded. Also, tap changers operate in discrete incremental units that may be too large to effectively mitigate the voltage excursions from grid bus 442. Further, transformer 434 may have no such voltage excursion remediation device and the voltage transients are passed through transformer 434 with little to no mitigation.

Therefore, in operation, m/g set 500 receives grid electric power 495 with the voltage excursions and generates one of auxiliary electric power 503 and 510 that includes voltages within the voltage tolerance bands of the loads on bus 514. Auxiliary power transformer 508 receives either of auxiliary electric power 503 and 510 and generates voltages within the rated tolerance bands of the loads on buses 516 and 518. Similar mitigation of voltage excursions may also be achieved when DFIG 318 is in service and auxiliary electric power system 205 is receiving generated power 490.

M/g sets 500 either include sufficient embedded regulation features or are coupled to an external controller to regulate the voltage of the electric power supplied to the equipment downstream. For larger and/or extended transients, e.g., LVRT/ZVRT transients, the inherent momentum of m/g set 500 facilitates the energy conversion process within m/g set 500, especially during extended transients. In addition, m/g set 500 facilitates providing auxiliary load buses 514, 516, and 518 with electric power with voltages within the rated voltage tolerance bands of the loads coupled thereto through HVRT transients.

Figure 6:
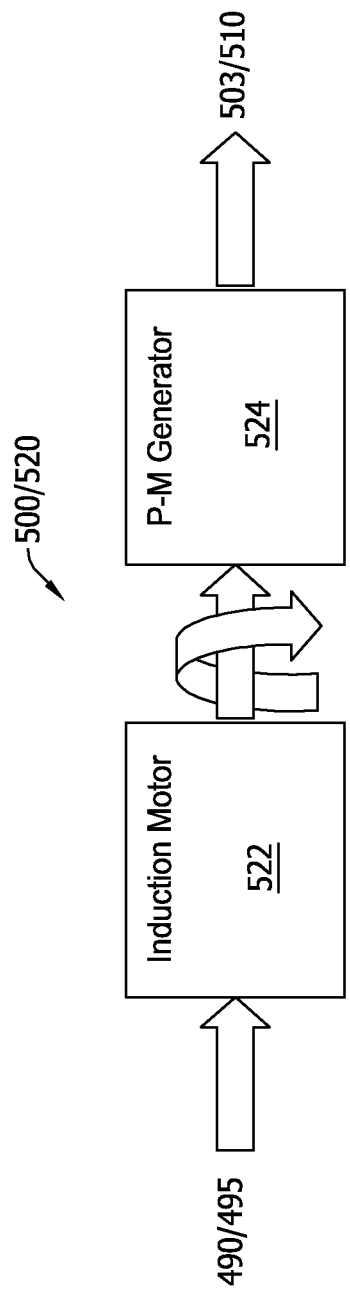
FIG. 6 is a schematic view of an exemplary motor-generator set that may be used with the auxiliary electric power system shown in FIG. 5.

FIG. 6 is a schematic view of an exemplary motor-generator (m/g) set 520 that may be used with auxiliary electric power system 205 (shown in FIG. 5) as m/g set 500. M/g set 520 includes an induction motor 522 that is coupled to conduit 502 (shown in FIG. 5) and is configured to receive generated electric power 490 and grid power 495, depending on the status of operation of DFIG 318 (shown in FIG. 5). M/g set 520 also includes a permanent-magnet (p-m) generator 524 rotatably coupled to induction motor 522. P-m generator 524 generates one of auxiliary electric power 503 within the first predetermined voltage tolerance range and auxiliary electric power 510 within the second predetermined voltage tolerance range. M/g set 520 generates auxiliary electric power 503 or 510 at a single predetermined voltage without modulation with a predetermined current output. M/g set 520 facilitates continued operation of auxiliary electric power system 205 with voltages within the rated tolerance bands for that equipment receiving auxiliary electric power 503 or 510 that typically does not have a requirement to operate within relatively tight and stringent voltage ranges. Therefore, m/g set 520 facilitates operation of the loads receiving auxiliary electric power 503 or 510 rather than grid characteristics.

Figure 7:
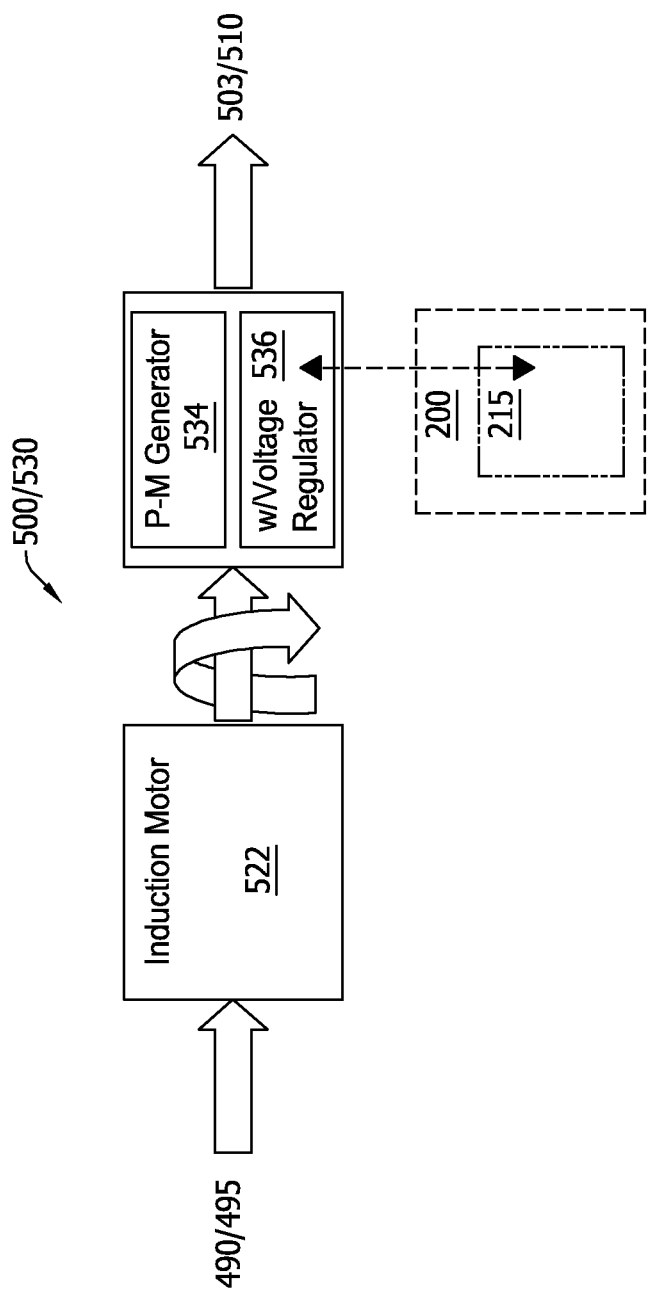
FIG. 7 is a schematic view of an exemplary alternative motor-generator set that may be used with the auxiliary electric power system shown in FIG. 5.

FIG. 7 is a schematic view of an exemplary alternative motor-generator (m/g) set 530 that may be used with auxiliary electric power system 205 (shown in FIG. 5) as m/g set 500. M/g set 530 includes induction motor 522 that is coupled to conduit 502 (shown in FIG. 5) and is configured to receive generated electric power 490 and grid power 495, depending on the status of operation of DFIG 318 (shown in FIG. 5). M/g set 530 also includes a permanent-magnet (p-m) generator 534 rotatably coupled to induction motor 522. P-m generator 534 generates one of auxiliary electric power 503 within the first predetermined voltage tolerance range and auxiliary electric power 510 within the second predetermined voltage tolerance range. P-m generator 534 includes a voltage regulation controller, i.e., regulator 536 that may be either one of a stand-alone device or coupled to controller 215 of auxiliary electric power system protection and control system 200. M/g set 530 generates auxiliary electric power 503 or 510 at a predetermined voltage with modulation. The current output may also be modulated. M/g set 530 facilitates continued operation of auxiliary power system 205 with voltages within the rated tolerance bands for grids that may have severe or extended voltage transients and operate within relatively broad voltage ranges. Therefore, m/g set 530 with voltage regulator 536 facilitates operation of loads receiving auxiliary electric power 503 or 510 that typically do have a requirement to operate within relatively tight and stringent voltage ranges.

Figure 8:
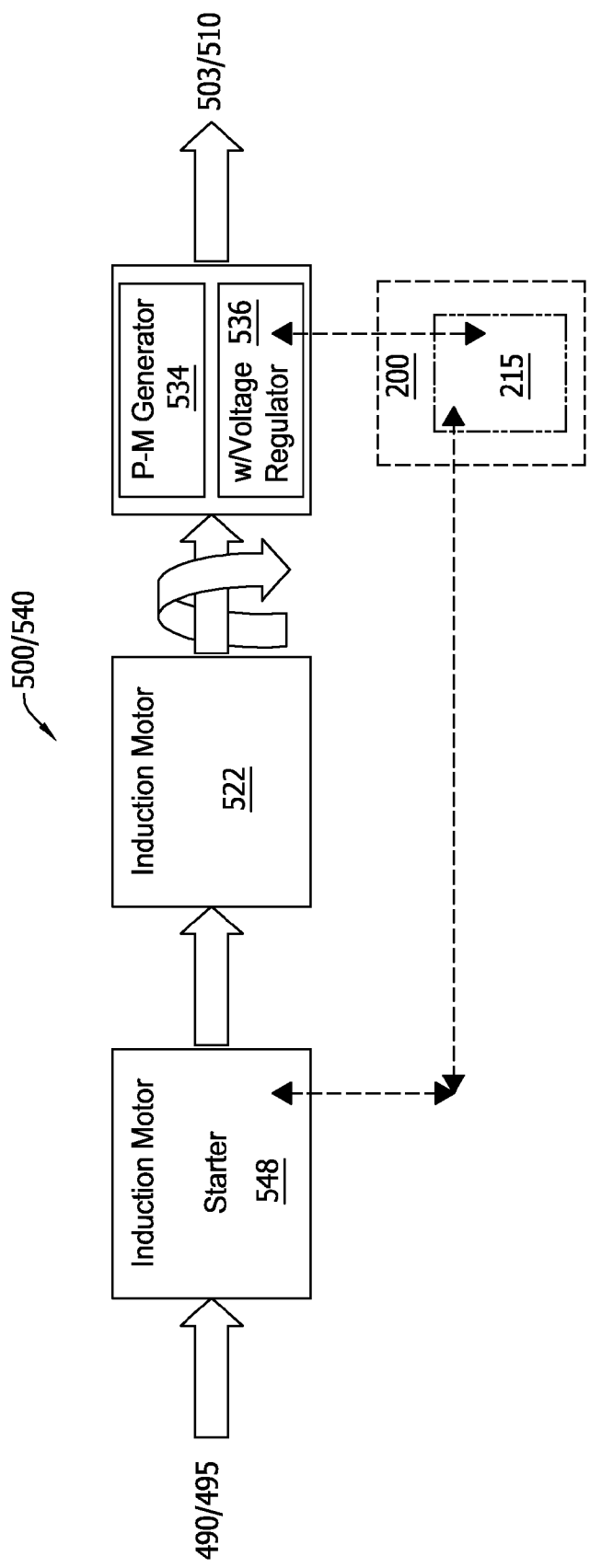
FIG. 8 is a schematic view of another exemplary alternative motor-generator set that may be used with the auxiliary electric power shown in system FIG. 5.

FIG. 8 is a schematic view of another exemplary alternative motor-generator (m/g) set 540 that may be used with auxiliary electric power system 205 (shown in FIG. 5) as m/g set 500. M/g set 540 is similar to m/g set 530 (shown in FIG. 8) with the exception that m/g set 540 includes an induction motor starter 548 coupled to induction motor 522. Induction motor starter 548 may be either one of a stand-alone device or coupled to controller 215 of auxiliary electric power system protection and control system 200. M/g set 540 facilitates continued operation of auxiliary power system 205 with voltages within the rated tolerance bands for grids that may have severe or extended voltage transients and operate within relatively broad voltage ranges. Induction motor starter 548 facilitates reducing and/or controlling the inrush of current when induction motor 522 is placed into service.

Figure 9:
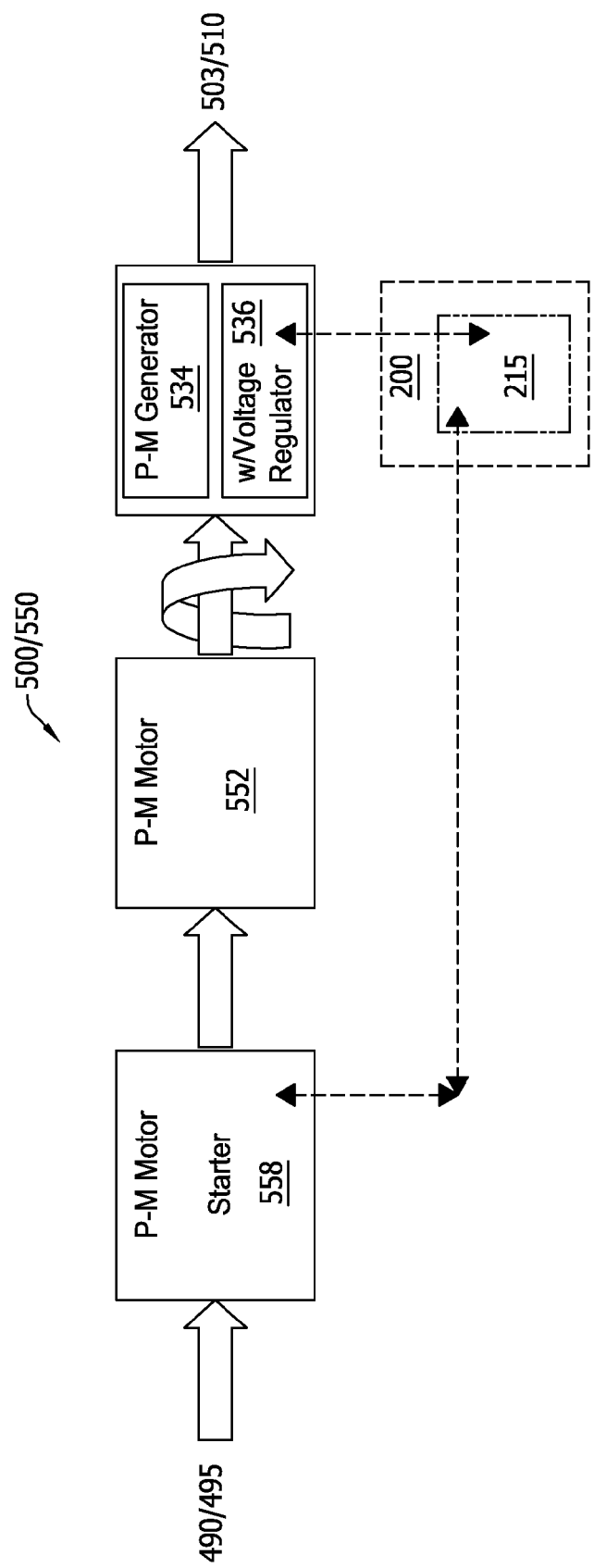
FIG. 9 is a schematic view of yet another exemplary alternative motor-generator set that may be used with the auxiliary electric power system shown in FIG. 5.

FIG. 9 is a schematic view of yet another exemplary alternative motor-generator (m/g) set 550 that may be used with the auxiliary electric power system shown in FIG. 5 as m/g set 500. M/g set 550 includes a permanent-magnet (p-m) motor 552 that is coupled to conduit 502 (shown in FIG. 5) and is configured to receive generated electric power 490 and grid power 495, depending on the status of operation of DFIG 318 (shown in FIG. 5). M/g set 550 also includes p-m generator 534 rotatably coupled to p-m motor 552. P-m generator 534 includes voltage regulator 536 that may be either one of a stand-alone device or coupled to controller 215 of auxiliary electric power system protection and control system 200. M/g set 550 includes a p-m motor starter 558 coupled to p-m motor 552. P-m motor starter 558 may be either one of a stand-alone device or coupled to controller 215 of auxiliary electric power system protection and control system 200. M/g set 550 generates auxiliary electric power 503 or 510 at a predetermined voltage with modulation. The current may also be modulated. M/g set 550 facilitates continued operation of auxiliary power system 205 with voltages within the rated tolerance bands for grids that may have severe or extended voltage transients and operate within relatively broad voltage ranges. Alternative embodiments of m/g set 500 may include, without limitation, p-m generator 524 (shown in FIG. 6), i.e., without a voltage regulator. P-m motor 552 facilitates increasing the overall efficiency of m/g set 550.

Figure 10:
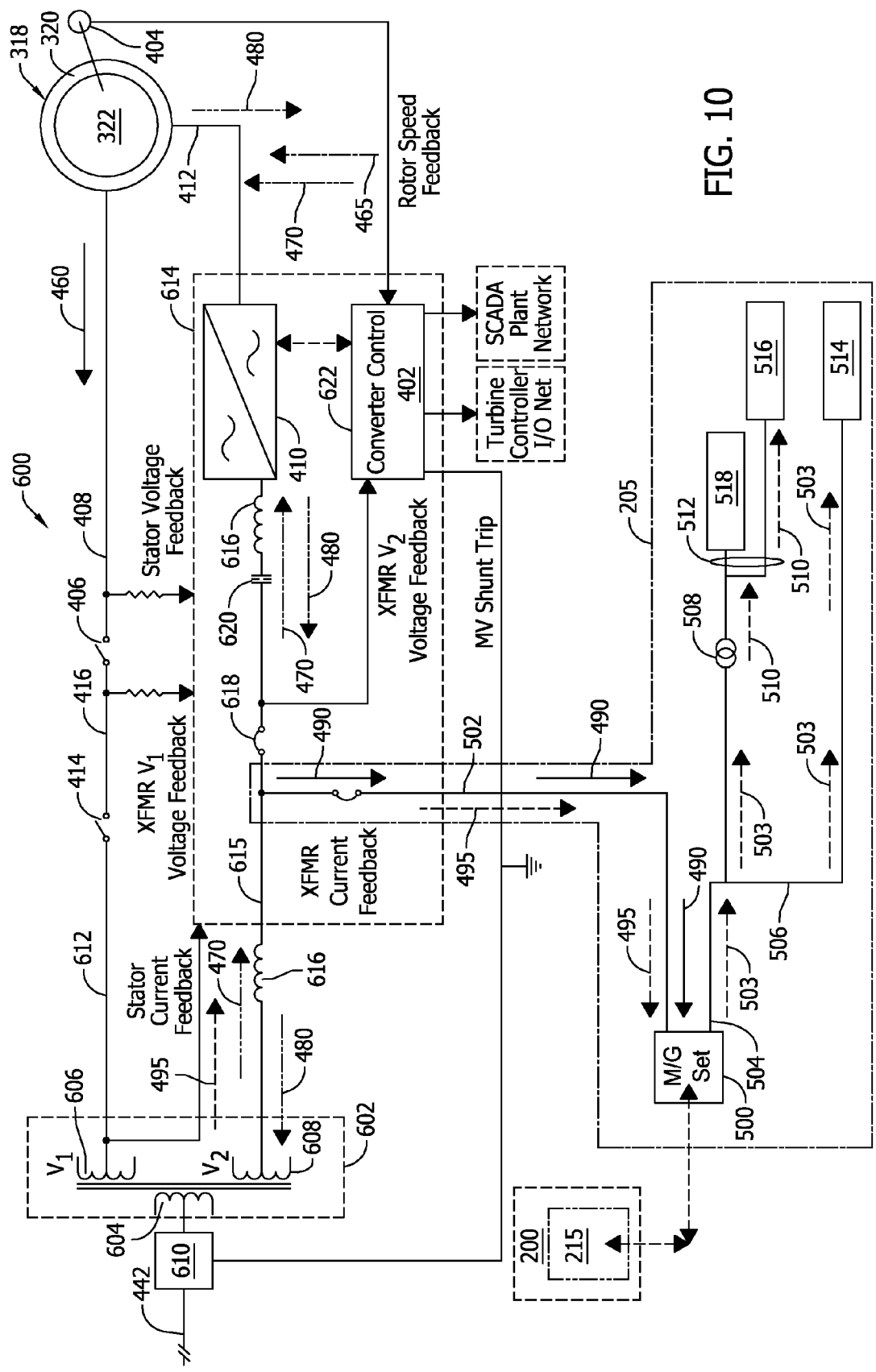
FIG. 10 is a schematic view of an exemplary alternative electric power system that may be used with the wind turbine shown in FIG. 3 that may use the auxiliary electric power system shown in FIG. 5.

FIG. 10 is a schematic view of an exemplary alternative electric power system 600 that may be used with wind turbine 300 (shown in FIG. 3) that may use auxiliary electric power system 205. Electric power system 600 includes an alternative main power transformer 602 that includes a set of high side windings 604 and two sets of low side windings, i.e., a first set of low side windings 606 and a second set of low side windings 608. High side windings 604 are coupled to medium voltage (MV) switchgear 610 that couples and uncouples grid bus 442 from main power transformer 602. First low side windings 606 are coupled to circuit breaker 414 through a first main power transformer bus 612. Also, windings 606 are configured to receive electric power 460 from stator 320 at a first voltage $V_1$.

Electric power system 600 also includes an alternative converter system 614. Converter system 614 includes electric power conversion assembly 410 coupled to rotor 322. Electric power conversion assembly 410 is also coupled to second low side windings 608 through a conduit 615, a plurality of inductive devices 616, a circuit breaker 618, and a converter contactor 620 that facilitates removing assembly 410 from service when DFIG 318 is removed from service. Converter system 614 also includes a converter control system 622 that receives a variety of feedback signals, regulates conversion assembly 410, and transmits signals to various other systems, including, without limitation, open and close signals to MV switchgear 610. Rotor-generated real power 480 at a second voltage $V_2$ is transmitted to grid bus 442 through second low side windings 608 and real power 470 to rotor 322 is transmitted from grid bus 442 to conversion assembly 410 through windings 608 at $V_2$. Similarly, grid power 495 is transmitted through windings 608 to conduit 615 at $V_2$ and generated power 480 is transmitted through conversion assembly 410 to conduit 615. Conduit 615 is coupled to supply conduit 502 and power 495 and power 490 are used in auxiliary electric power system 205 as described above.

Main power transformer 602 and main power transformer 434 (shown in FIG. 5) are interchangeable between systems 400 and 600 as are conversion assembly 410 and converter system 614.

Figure 11:
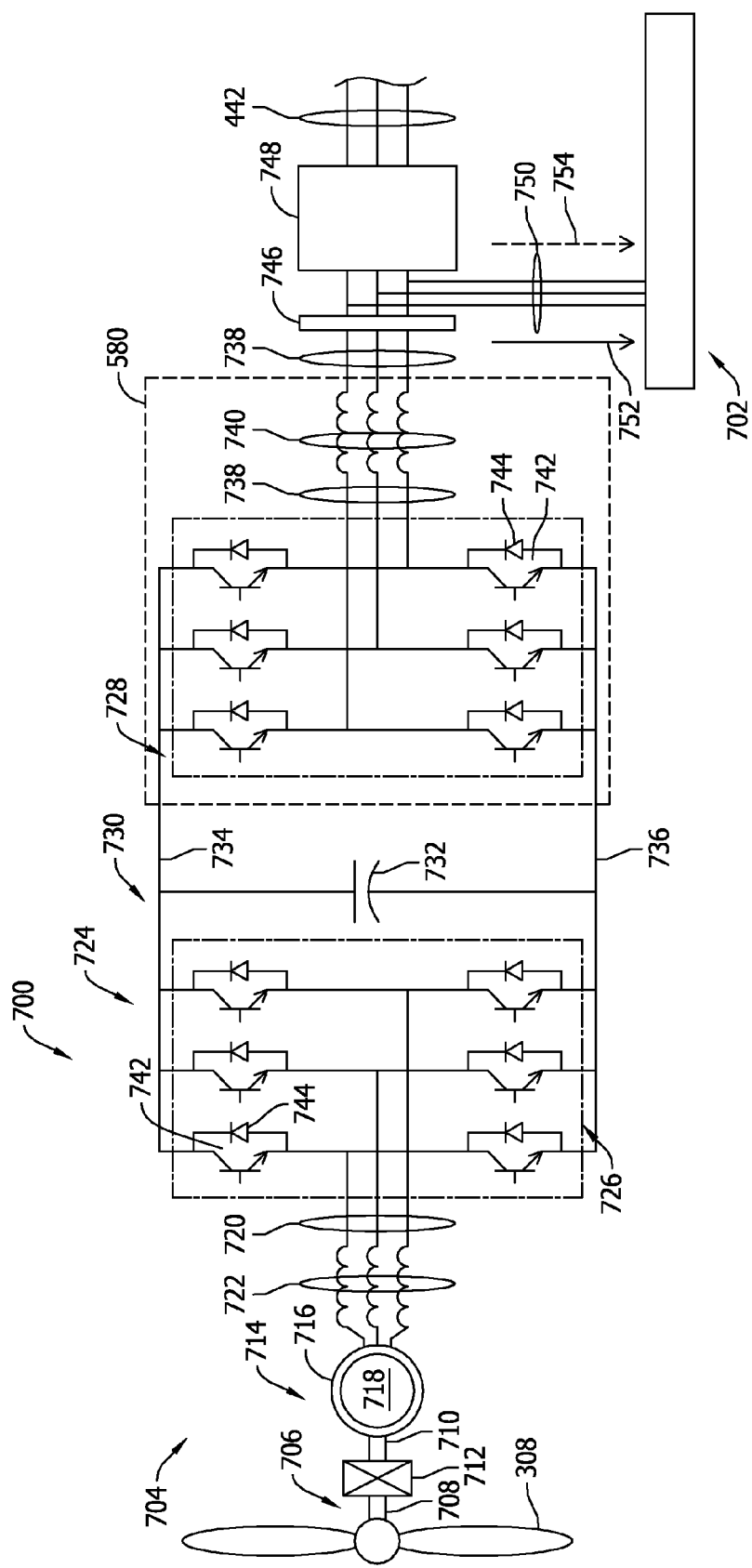
FIG. 11 is a schematic view of an exemplary alternative electric power system and exemplary alternative auxiliary electric power system that may be used with an exemplary alternative wind turbine.

FIG. 11 is a schematic view of an exemplary alternative electric power system and exemplary alternative auxiliary electric power system 700 that may be used with an exemplary alternative wind turbine generator 704. Wind turbine generator 704 includes wind turbine blades 308 coupled to a rotor 706 that includes a low speed shaft 708 and a high speed shaft 710. Wind turbine generator 704 also includes a gearbox 712 rotatably coupled to low speed shaft 708 and high speed shaft 710. A generator 714 is rotatably coupled to high speed shaft 710. In the exemplary embodiment, generator 714 is any type of generator that enables operation of wind turbine generator 300 as described herein, including, without limitation, a synchronous permanent magnet generator (PMG) and an electrically excited synchronous generator (EESG). Gearbox 712 steps-up a rotational velocity of low speed shaft 708 to attain a rotational velocity of high speed shaft 710 that is closer to synchronous speed.

Also, in this exemplary alternative embodiment, electric power system 700 is a three-phase system. Generator 714 includes a generator stator 716 extending about a generator rotor 718 that is rotatably coupled to high speed shaft 710. Stator 716 is coupled to a stator bus 720 through a plurality of inductive devices 722. Stator bus 720 is coupled to an electric power converter 724. Electric power converter 724 includes a generator side portion 726 coupled to stator bus 720. Generator side portion 726 is coupled to a line side portion 728 through a DC link 730. DC link 730 includes at least one capacitive device 732 coupled to a positive DC bus 734 and a negative DC bus 736. Line side portion 728 is coupled to an AC line bus 738 that includes at least one inductive device 740. Stator bus 720 transmits three-phase electric power to generator side portion 726 and AC line bus 738 transmits three-phase electric power away from line side portion 728.

Each of generator side portion 726 and line side portion 728 of electric power converter 724 includes a plurality of semiconductor switching devices 742 coupled together in serial arrangement for each phase of electrical power that electric power converter 724 receives, converts, and transmits. In the exemplary embodiment, switching devices 742 are semiconductor devices, e.g., insulated gate bipolar transistors (IGBTs), that include base, emitter, and collector portions (not shown) and an inverse, or anti-parallel diode 744. Alternatively, switching devices 742 are any other suitable transistor or any other suitable switching device, including, without limitation, gate turn-off thyristors (GTOs). Alternatively, generator side portion 726 and line side portion 728 may include any suitable number of switching devices 742 arranged in any suitable configuration. A stator-synchronizing switch 746 couples AC line bus 738 to a main power transformer 748 that couples electric power system 700 to electric power grid bus 442 when switch 746 is closed. Main power transformer 748 may be similar to one of main power transformer 434 (shown in FIGS. 4 and 5) and main power transformer 602 (shown in FIG. 10). Alternatively, main power transformer 748 has any configuration that enables operation of electric power system 700 and auxiliary electric power system 702 as described herein.

Electric power system 700 includes auxiliary electric power system 702 that is similar to auxiliary electric power system 205 (shown in FIGS. 2, 4, 5, and 10). The plurality of supply conduits 750 are similar to supply conduit 502 (shown in FIGS. 5 and 10). Supply conduits 750 transmit generated real power 752 and grid power 754. Operation of auxiliary electric power system 702 is substantially similar to that for auxiliary electric power system 205.

In some alternative embodiments, a combination of electric power generation devices are used in conjunction with, or in place of, wind turbine generators 300 and 704. In at least one alternative embodiment, wind turbine generator 300/704 is replaced with solar panels (not shown) coupled to form one or more solar arrays (not shown) to facilitate operating at a desired power output with supplemental, solar-generated power. Solar panels include, in one alternative embodiment, one or more of a photovoltaic panel, a solar thermal collector, or any other device that converts solar energy to electrical energy. In such alternative embodiments, each solar panel is a photovoltaic panel that generates a substantially direct current power as a result of solar energy striking solar panels.

Also, in such alternative embodiments, each solar array is coupled to a power converter that is similar to at least a portion of electric power converter 724 that converts the DC power to AC power that is transmitted to a transformer, similar to main power transformer 748, and then subsequently to grid bus 442. Furthermore, although generally described herein with respect to wind turbine generator 704 and a solar array facility, the methods and systems described herein are applicable to any type of electric generation system, with or without a power converter, including, for example, fuel cells, thermal power generators, geothermal generators, hydropower generators, diesel generators, gasoline generators, and/or any other device that generates power from renewable and/or non-renewable energy sources.

Exemplary embodiments of an electric power generation facility, an electric power system, and an auxiliary electric power system and methods for operating the same are described above in detail. The methods, facilities, systems, and apparatus are not limited to the specific embodiments described herein, but rather, components of the facilities, systems, and apparatus, and/or steps of the methods may be utilized independently and separately from other components and/or steps described herein. For example, auxiliary electric power system and methods may also be used in combination with other power conversion apparatus and methods, and are not limited to practice with only the electric power systems as described herein. Rather, the exemplary embodiment can be implemented and utilized in connection with many other electric power conversion applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric power system for a wind turbine, said electric power system comprising:
   at least one auxiliary load bus configured to transmit electric power to auxiliary equipment, said auxiliary load bus further configured to receive electric power having a voltage within one of a first predetermined tolerance range and a second predetermined tolerance range;
   at least one motor-generator set coupled to said auxiliary load bus, said motor-generator set configured to receive electric power having a voltage within a third predetermined tolerance range and transmit electric power to said auxiliary load bus in the first predetermined tolerance range; and,
   at least one main power transformer directly coupled to an electric utility grid and directly coupled to said motor-generator set.

2. The electric power system in accordance with claim 1, further comprising at least one auxiliary power transformer coupled to said motor-generator set and said auxiliary load bus.

3. The electric power system in accordance with claim 2, wherein:
   said motor-generator set is configured to transmit electric power to said auxiliary power transformer in the first predetermined voltage tolerance range; and,
   said auxiliary power transformer is configured to transmit electric power to said auxiliary load bus in the second predetermined voltage tolerance range.

4. The electric power system in accordance with claim 1, wherein said motor-generator set is configured to receive electric power from each of a wind turbine generator and the electric utility grid in the third predetermined voltage tolerance range.

5. The electric power system in accordance with claim 1, wherein said motor-generator set comprises:
   one of an induction motor and a permanent-magnet motor; and,
   a permanent-magnet generator coupled to said one of said induction motor and said permanent-magnet motor.

6. The electric power system in accordance with claim 5, wherein said motor-generator set further comprises an induction motor starter coupled to said induction motor.

7. The electric power system in accordance with claim 5, wherein said permanent-magnet generator comprises a voltage regulation controller configured to modulate voltage generation through regulation of said permanent-magnet generator.

8. The electric power system in accordance with claim 7, wherein said voltage regulation controller comprises:
   at least one processor; and,
   at least one non-transitory computer-readable storage media coupled to said processor, said non-transitory computer-readable storage media having computer-executable instructions embodied thereon, wherein when executed by said processor, the computer-executable instructions cause said processor to operate said motor-generator set to regulate the voltage and current transmitted to said auxiliary load bus.

9. A renewable energy generation facility comprising:
   at least one electric power doubly-fed induction generator (DFIG); and,
   an auxiliary electric power system coupled to said DFIG, said auxiliary electric power system comprising:
   at least one auxiliary load bus configured to receive electric power having a voltage within one of a first predetermined tolerance range and a second predetermined tolerance range;
   at least one electric power generator auxiliary load coupled to said auxiliary load bus, said auxiliary load bus configured to transmit electric power to said auxiliary load;
   at least one motor-generator set coupled to said auxiliary load bus, said motor-generator set configured to receive electric power having a voltage within a third predetermined tolerance range and transmit electric power to said auxiliary load bus in the first predetermined tolerance range; and,
   at least one main power transformer directly coupled to an electric utility grid and directly coupled to said motor-generator set.

10. The renewable energy generation system in accordance with claim 9, further comprising at least one auxiliary power transformer coupled to said motor-generator set and said auxiliary load bus.

11. The renewable energy generation system in accordance with claim 10, wherein:
    said motor-generator set is configured to transmit electric power to said auxiliary power transformer in the first predetermined voltage tolerance range; and,
    said auxiliary power transformer is configured to transmit electric power to said auxiliary load bus in the second predetermined voltage tolerance range.

12. The renewable energy generation system in accordance with claim 9, wherein said motor-generator set is configured to receive electric power from each of a wind turbine generator and the electric utility grid in the third predetermined voltage tolerance range.

13. The renewable energy generation system in accordance with claim 9, wherein said motor-generator set comprises:
    an induction motor; and,
    a permanent-magnet generator coupled to said induction motor.

14. The renewable energy generation system in accordance with claim 13, wherein said at least one motor-generator set further comprises an induction motor starter coupled to said induction motor.

15. The renewable energy generation system in accordance with claim 13, wherein said permanent-magnet generator comprises a voltage regulation controller configured to modulate voltage generation through regulation of said permanent-magnet generator.

16. The renewable energy generation system in accordance with claim 15, wherein said voltage regulation controller comprises:
    at least one processor; and,
    at least one non-transitory computer-readable storage media coupled to said processor, said non-transitory computer-readable storage media having computer-executable instructions embodied thereon, wherein when executed by said processor, the computer-executable instructions cause said processor to operate said motor-generator to regulate the voltage and current transmitted to said auxiliary load bus.

17. A method for controlling operation of a renewable energy generation system, the renewable energy generation system including a doubly-fed induction generator (DFIG), at least one auxiliary load bus configured to receive electric power having a voltage within one of a first predetermined tolerance range and a second predetermined tolerance range, at least one motor-generator set coupled to the at least one auxiliary load bus, and at least one main power transformer directly coupled to an electric utility grid and directly coupled to the at least one motor-generator set, said method comprising:
- transmitting electric power from one of the DFIG and an electric utility grid to the at least one motor-generator set, the electric power having a voltage within a third predetermined tolerance range, wherein the electric power transmitted from the electric utility grid to the at least one motor generator set is transmitted through the at least one main power transformer; and,
- regulating the motor-generator set to transmit electric power having a voltage within the first predetermined tolerance range to the auxiliary load bus.

18. The method in accordance with claim 17, further comprising facilitating operation of at least one of a low voltage ride through (LVRT) feature, a zero voltage ride through (ZVRT) feature, and a high voltage ride through (HVRT) feature through converting at least a portion of an inertia of the motor-generator set to electric power transmitted from the motor-generator to the auxiliary load bus.

\* \* \* \* \*